US009701265B2

(12) United States Patent
Breed (10) Patent No.: US 9,701,265 B2
(45) Date of Patent: *Jul. 11, 2017

(54) SMARTPHONE-BASED VEHICLE CONTROL METHODS (71) Applicant: Intelligent Technologies International, Inc., Miami Beach, FL (US)

(72) Inventor: David S Breed, Miami Beach, FL (US)

(73) Assignee: Intelligent Technologies International, Inc., Miami Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/968,027

(22) Filed: Dec. 14, 2015

(65) Prior Publication Data

US 2016/0090055 A1 Mar. 31, 2016

Related U.S. Application Data (63) Continuation-in-part of application No. 13/270,353, filed on Oct. 11, 2011, now Pat. No. 9,211,811, which (Continued)

(51) Int. Cl.
*B60R 16/037* (2006.01)
*B60R 25/25* (2013.01)

(Continued)

(52) U.S. Cl.
CPC .......... *B60R 16/037* (2013.01); *B60C 23/00* (2013.01); *B60C 29/066* (2013.01); *B60N 2/002* (2013.01);

(Continued)

(58) Field of Classification Search
CPC ..... B60R 16/037; B60R 25/25; B60R 21/013; B60R 21/0136; B60R 21/01554; B60R 21/01546; B60R 21/01536; B60R 21/01532; B60R 21/01516; B60R 21/01534; B60R 21/01538;

(Continued)

(56) References Cited

U.S. PATENT DOCUMENTS 4,358,756 A 11/1982 Morel et al.
4,999,614 A 3/1991 Ueda et al.

(Continued)

FOREIGN PATENT DOCUMENTS

JP 2001-313696 A 11/2001

*Primary Examiner* — Russell Frejd
(74) *Attorney, Agent, or Firm* — Brian Roffe (57) ABSTRACT Method for controlling a vehicle including a smartphone-engaging coupling element. Data about operational status of the vehicle is transferred from one or more vehicle-resident systems to a smartphone when the smartphone is engaged with the coupling element. Commands are received by the vehicle from the smartphone when the smartphone is engaged with the coupling element, which commands being based in part on data previously transferred from the vehicle-resident system(s) to the smartphone when the smartphone is engaged with the coupling element. A vehicular system, e.g., seat positioning system, mirror positioning system, passenger compartment temperature control system, route guidance or navigation system, changes its operation in accordance with the commands received by the vehicle from the smartphone when the smartphone is engaged with the coupling element.

20 Claims, 4 Drawing Sheets

Related U.S. Application Data is a continuation-in-part of application No. 11/947,028, filed on Nov. 29, 2007, now Pat. No. 8,035,508, which is a continuation-in-part of application No. 10/940,881, filed on Sep. 13, 2004, now Pat. No. 7,663,502, which is a continuation-in-part of application No. 10/457,238, filed on Jun. 9, 2003, now Pat. No. 6,919,803, said application No. 10/940,881 is a continuation-in-part of application No. 10/931,288, filed on Aug. 31, 2004, now Pat. No. 7,164,117, said application No. 11/947,028 is a continuation-in-part of application No. 11/278,979, filed on Apr. 7, 2006, now Pat. No. 7,386,372, which is a continuation-in-part of application No. 10/931,288, filed on Aug. 31, 2004, now Pat. No. 7,164,117, said application No. 11/947,028 is a continuation-in-part of application No. 11/380,574, filed on Apr. 27, 2006, now Pat. No. 8,159,338, which is a continuation-in-part of application No. 10/931,288, filed on Aug. 31, 2004, now Pat. No. 7,164,117, said application No. 11/947,028 is a continuation-in-part of application No. 11/619,863, filed on Jan. 4, 2007, now Pat. No. 8,948,442, which is a continuation-in-part of application No. 10/931,288, filed on Aug. 31, 2004, now Pat. No. 7,164,117, said application No. 11/947,028 is a continuation-in-part of application No. 11/755,199, filed on May 30, 2007, now Pat. No. 7,911,324, and a continuation-in-part of application No. 11/843,932, filed on Aug. 23, 2007, now Pat. No. 8,310,363, and a continuation-in-part of application No. 11/865,363, filed on Oct. 1, 2007, now Pat. No. 7,819,003.

(60) Provisional application No. 60/387,792, filed on Jun. 11, 2002.

(51) Int. Cl.

| | | |
|---|---|---|
| *B60R 21/013* | (2006.01) | |
| *B60R 21/0136* | (2006.01) | |
| *B60R 21/015* | (2006.01) | |
| *B60R 21/0132* | (2006.01) | |
| *B60R 21/0134* | (2006.01) | |
| *B60R 21/203* | (2006.01) | |
| *B60R 21/2165* | (2011.01) | |
| *B60R 21/276* | (2006.01) | |
| *B60R 22/20* | (2006.01) | |
| *H04W 4/00* | (2009.01) | |
| *H01Q 1/32* | (2006.01) | |
| *B60N 2/48* | (2006.01) | |
| *B60N 2/66* | (2006.01) | |
| *B60N 2/00* | (2006.01) | |
| *B60N 2/015* | (2006.01) | |
| *B60N 2/06* | (2006.01) | |
| *B60N 2/28* | (2006.01) | |
| *G01G 19/414* | (2006.01) | |
| *G01M 5/00* | (2006.01) | |
| *G01F 23/00* | (2006.01) | |
| *G01F 23/20* | (2006.01) | |
| *G01F 23/296* | (2006.01) | |
| *G06F 3/02* | (2006.01) | |
| *G06F 3/023* | (2006.01) | |
| *G06K 9/00* | (2006.01) | |
| *G07C 5/00* | (2006.01) | |
| *G07C 5/08* | (2006.01) | |
| *G08B 25/01* | (2006.01) | |
| *B60C 23/00* | (2006.01) | |
| *B60C 29/06* | (2006.01) | |
| *B60N 2/02* | (2006.01) | |
| *G01S 7/41* | (2006.01) | |
| *B60R 1/12* | (2006.01) | |
| *B60R 21/00* | (2006.01) | |
| *B60R 21/231* | (2011.01) | |
| *B60R 21/26* | (2011.01) | |
| *B60R 22/28* | (2006.01) | |
| *B60R 22/46* | (2006.01) | |
| *B60R 22/48* | (2006.01) | |
| *G01S 13/93* | (2006.01) | |
| *G08B 13/196* | (2006.01) | |

(52) U.S. Cl.
CPC .......... *B60N 2/015* (2013.01); *B60N 2/0232* (2013.01); *B60N 2/0244* (2013.01); *B60N 2/0248* (2013.01); *B60N 2/0252* (2013.01); *B60N 2/0276* (2013.01); *B60N 2/067* (2013.01); *B60N 2/28* (2013.01); *B60N 2/2806* (2013.01); *B60N 2/2863* (2013.01); *B60N 2/4829* (2013.01); *B60N 2/4852* (2013.01); *B60N 2/4885* (2013.01); *B60N 2/66* (2013.01); *B60R 21/013* (2013.01); *B60R 21/0136* (2013.01); *B60R 21/01516* (2014.10); *B60R 21/01526* (2014.10); *B60R 21/01532* (2014.10); *B60R 21/01534* (2014.10); *B60R 21/01536* (2014.10); *B60R 21/01538* (2014.10); *B60R 21/01542* (2014.10); *B60R 21/01546* (2014.10); *B60R 21/01552* (2014.10); *B60R 21/01554* (2014.10); *B60R 25/25* (2013.01); *G01F 23/0076* (2013.01); *G01F 23/20* (2013.01); *G01F 23/2962* (2013.01); *G01G 19/4142* (2013.01); *G01M 5/0008* (2013.01); *G06F 3/0219* (2013.01); *G06F 3/0233* (2013.01); *G06F 3/0237* (2013.01); *G06F 3/0238* (2013.01); *G06K 9/00362* (2013.01); *G06K 9/00624* (2013.01); *G06K 9/00832* (2013.01); *G07C 5/008* (2013.01); *G07C 5/0808* (2013.01); *G08B 25/016* (2013.01); *H01Q 1/3291* (2013.01); *H04W 4/008* (2013.01); *B60N 2002/0268* (2013.01); *B60N 2002/0272* (2013.01); *B60R 21/0132* (2013.01); *B60R 21/0134* (2013.01); *B60R 21/0153* (2014.10); *B60R 21/01544* (2014.10); *B60R 21/01548* (2014.10); *B60R 21/203* (2013.01); *B60R 21/21656* (2013.01); *B60R 21/276* (2013.01); *B60R 22/201* (2013.01); *B60R 2001/1223* (2013.01); *B60R 2001/1253* (2013.01); *B60R 2021/0027* (2013.01); *B60R 2021/01315* (2013.01); *B60R 2021/23153* (2013.01); *B60R 2021/26094* (2013.01); *B60R 2021/2765* (2013.01); *B60R 2022/208* (2013.01); *B60R 2022/288* (2013.01); *B60R 2022/4685* (2013.01); *B60R 2022/4825* (2013.01); *G01S 7/417* (2013.01); *G01S 2013/936* (2013.01); *G01S 2013/9321* (2013.01); *G01S 2013/9332* (2013.01); *G08B 13/19647* (2013.01)

(58) Field of Classification Search
CPC ........ B60R 21/01542; B60R 21/01552; B60R 21/01526; B60R 21/0132; B60R 21/0134; B60R 21/203; B60R 21/21656; B60R 21/276; B60R 22/201; B60R 2001/1223
See application file for complete search history.

(56) References Cited

U.S. PATENT DOCUMENTS

| | | |
|---|---|---|
| 5,025,253 A | 6/1991 | DiLullo et al. |
| 5,218,367 A | 6/1993 | Sheffer et al. |
| 5,311,197 A | 5/1994 | Sorden et al. |
| 5,334,974 A | 8/1994 | Simms et al. |
| 5,504,482 A | 4/1996 | Schreder |
| 5,515,043 A | 5/1996 | Berard et al. |
| 5,555,286 A | 9/1996 | Tendler |
| 5,557,254 A | 9/1996 | Johnson et al. |
| 5,574,427 A | 11/1996 | Cavallaro |
| 5,673,305 A | 9/1997 | Ross |
| 5,691,980 A | 11/1997 | Welles, II et al. |
| 5,742,915 A | 4/1998 | Stafford |
| 5,959,529 A | 9/1999 | Kail, IV |
| 5,959,568 A | 9/1999 | Woolley |
| 5,990,801 A | 11/1999 | Kyouno et al. |
| 6,029,072 A | 2/2000 | Barber |
| 6,100,806 A | 8/2000 | Gaukel |
| 6,147,598 A | 11/2000 | Murphy et al. |
| 6,148,212 A | 11/2000 | Park et al. |
| 6,166,627 A | 12/2000 | Reeley |
| 6,167,255 A | 12/2000 | Kennedy, III et al. |
| 6,255,942 B1 | 7/2001 | Knudsen |
| 6,349,266 B1 | 2/2002 | Lysaght et al. |
| 6,377,825 B1 | 4/2002 | Kennedy et al. |
| 6,405,033 B1 | 6/2002 | Kennedy, III et al. |
| 6,509,868 B2 | 1/2003 | Flick |
| 6,510,236 B1 | 1/2003 | Crane et al. |
| 6,535,107 B1 | 3/2003 | Bartz |
| 6,535,743 B1 | 3/2003 | Kennedy, III et al. |
| 6,611,201 B1 | 8/2003 | Bishop et al. |
| 6,628,040 B2 | 9/2003 | Pelrine et al. |
| 6,636,790 B1 | 10/2003 | Lightner et al. |
| 6,697,638 B1 | 2/2004 | Larsson et al. |
| 6,701,776 B2 | 3/2004 | Stetter |
| 6,745,027 B2 | 6/2004 | Twitchell, Jr. |
| 6,768,246 B2 | 7/2004 | Pelrine et al. |
| 6,794,991 B2 | 9/2004 | Dungan |
| 6,804,558 B2 | 10/2004 | Haller et al. |
| 6,816,072 B2 | 11/2004 | Zoratti |
| 6,889,194 B1 | 5/2005 | Kadaba |
| 6,909,361 B2 | 6/2005 | McCarthy et al. |
| 6,919,803 B2 | 7/2005 | Breed |
| 6,925,335 B2 | 8/2005 | May et al. |
| 7,027,834 B2 | 4/2006 | Soini et al. |
| 7,148,803 B2 | 12/2006 | Bandy et al. |
| 7,181,505 B2 | 2/2007 | Haller et al. |
| 7,209,813 B2 | 4/2007 | Namaky |
| 7,257,426 B1 | 8/2007 | Witkowski et al. |
| 7,558,557 B1 | 7/2009 | Gollnick et al. |
| 7,801,507 B2 | 9/2010 | Benco et al. |
| 8,214,100 B2 | 7/2012 | Lowrey et al. |
| 8,244,307 B1 | 8/2012 | Tilgner et al. |
| 8,264,320 B2 | 9/2012 | Nelson |
| 8,285,439 B2 | 10/2012 | Hodges |
| 8,325,026 B2 | 12/2012 | Ramirez et al. |
| RE43,990 E | 2/2013 | Golden |
| 8,520,069 B2 | 8/2013 | Haler |
| 8,548,674 B2 | 10/2013 | Namaky |
| 2002/0061758 A1 | 5/2002 | Zarlengo et al. |
| 2005/0090279 A9 | 4/2005 | Witkowski et al. |
| 2006/0229114 A2 | 10/2006 | Kim, II |
| 2007/0005213 A1 | 1/2007 | Nou et al. |
| 2009/0286504 A1 | 11/2009 | Krasner et al. |
| 2011/0084820 A1 | 4/2011 | Walter et al. |
| 2011/0269441 A1 | 11/2011 | Silver |
| 2012/0158213 A1 | 6/2012 | Talty et al. |
| 2012/0225634 A1 | 9/2012 | Gee et al. |
| 2012/0232749 A1 | 9/2012 | Schoenberg et al. |
| 2012/0252364 A1 | 10/2012 | Inabathuni et al. |
| 2012/0273437 A1 | 11/2012 | Russo |
| 2013/0012179 A1 | 1/2013 | Watkins et al. |
| 2013/0103236 A1 | 4/2013 | Mehrgan |
| 2013/0241749 A1 | 9/2013 | Schibler |
| 2015/0163649 A1 | 6/2015 | Chen |
| 2016/0371983 A1 | 12/2016 | Ronning et al. |
| 2017/0011467 A1 | 1/2017 | Farmer |
| 2017/0021802 A1 | 1/2017 | Mims |
| 2017/0032673 A1 | 2/2017 | Scofield et al. |
| 2017/0041737 A1 | 2/2017 | Fischer |
| 2017/0046898 A1 | 2/2017 | Cabouli |

SMARTPHONE-BASED VEHICLE CONTROL METHODS

CROSS REFERENCE TO RELATED APPLICATIONS

This application is a continuation-in-part (CIP) of U.S. patent application Ser. No. 13/270,353 filed Oct. 11, 2011, now U.S. Pat. No. 9,211,811, which is a CIP of U.S. patent application Ser. No. 11/947,028 filed Nov. 29, 2007, now U.S. Pat. No. 8,035,508, which is 1. a CIP of U.S. patent application Ser. No. 10/940,881 filed Sep. 3, 2004, now U.S. Pat. No. 7,663,502, which is:
    A. a CIP of U.S. patent application Ser. No. 10/457,238 filed Jun. 9, 2003, now U.S. Pat. No. 6,919,803, which claims priority under 35 U.S.C. §119(e) of U.S. provisional patent application Ser. No. 60/387,792 filed Jun. 11, 2002;
    B. a CIP of U.S. patent application Ser. No. 10/931,288 filed Aug. 31, 2004, now U.S. Pat. No. 7,164,117;
2. a CIP of U.S. patent application Ser. No. 11/278,979 filed Apr. 7, 2006, now U.S. Pat. No. 7,386,372, which is a CIP of U.S. patent application Ser. No. 10/931,288 filed Aug. 31, 2004, now U.S. Pat. No. 7,164,117;
3. a CIP of U.S. patent application Ser. No. 11/380,574 filed Apr. 27, 2006, now U.S. Pat. No. 8,159,338, which is a CIP of U.S. patent application Ser. No. 10/931,288 filed Aug. 31, 2004, now U.S. Pat. No. 7,164,117;
4. a CIP of U.S. patent application Ser. No. 11/619,863 filed Jan. 4, 2007, now U.S. Pat. No. 8,948,442, which is a CIP of U.S. patent application Ser. No. 10/931,288 filed Aug. 31, 2004, now U.S. Pat. No. 7,164,117;
5. a CIP of U.S. patent application Ser. No. 11/755,199 filed May 30, 2007, now U.S. Pat. No. 7,911,324;
6. a CIP of U.S. patent application Ser. No. 11/843,932 filed Aug. 23, 2007, now U.S. Pat. No. 8,310,363; and
7. a CIP of U.S. patent application Ser. No. 11/865,363 filed Oct. 1, 2007, now U.S. Pat. No. 7,819,003.

The present invention is also related to U.S. patent application Ser. No. 11/927,934, filed Oct. 30, 2007, now abandoned.

All of the foregoing patent application and all references, patents and patent applications that are mentioned below are incorporated by reference in their entirety as if they had each been set forth herein in full.

FIELD OF THE INVENTION

The present invention relates generally to methods and systems for interacting with and controlling a vehicle using smartphones or similar portable telecommunications devices, such as cell phones and PDAs.

BACKGROUND OF THE INVENTION

Background of the invention is found in U.S. Pat. No. 6,919,803.

Definitions in the Background of the Invention section of any of the above-mentioned applications are also generally, but not restrictively, applicable herein.

For the purposes herein, the term "smartphone" will generally include any portable device that has both computational and communication capabilities.

The smartphone world is changing rapidly. Not only is device-resident computing power and memory increasing exponentially, but with access to the "cloud", there is effectively an infinite resource for both storage and computing power. In addition, access to the Internet is now, for all practical purposes, ubiquitous. If a Wi-Fi hotspot, cell phone tower or infrastructure-located DSRC transceiver is not within range, a LEO satellite system is. Usually on the continental United States, multiple communication systems are simultaneously available.

Smartphones can keep up with these changes, but cars cannot. The average life of a vehicle is increasing and now exceeding ten years, making it a poor location of new technology, whereas people change their cell phones every year or so to get the latest technology. Furthermore, the smartphone is becoming an indispensible object to be carried by an increasing number of people in many cases replacing most, if not all, of the traditional functions of a wallet. The smartphone can have biometric sensors to identify and authenticate the possessor and thereafter it can act as the keys to the house, apartment, office and car and as the means of making payments replacing credit cards.

On the other hand, in a vehicle, various devices such as diagnostic sensors, occupant sensors, crash sensors, cameras, radars, and satellite antennas are necessary for the safe and efficient operation of the vehicle. These devices are bulky, must be precisely located and consume significant power and thus need to be mounted on the vehicle. However, in general, the technological evolution of these devices is slow compared with smartphones and their life is closer to that of the vehicle.

SUMMARY OF THE INVENTION

A method for controlling a vehicle in accordance with the invention includes arranging a smartphone-engaging coupling element in the vehicle, causing data about operational status of the vehicle to be transferred from one or more vehicle-resident systems to a smartphone when the smartphone is engaged with the coupling element, the smartphone being usable for voice and data communications independent of the vehicle when outside of a compartment defined by the vehicle, and causing commands to be received by the vehicle from the smartphone when the smartphone is engaged with the coupling element. These commands are based in part on data previously transferred from the one or more vehicle-resident systems to the smartphone when the smartphone is engaged with the coupling element. The at least one vehicular system is caused to change its operation in accordance with the commands received by the vehicle from the smartphone when the smartphone is engaged with the coupling element.

Data about operational status of the vehicle may be data from one or more vehicle-resident sensors which is generated before or when the smartphone is engaged with the coupling element and then transferred to the smartphone when the smartphone is engaged with the coupling element. In this case, the vehicle-resident sensor(s) may change operation upon command from or by the smartphone. Data about operational status of the vehicle may additionally or alternatively be data from one or more vehicle-resident actuators, antennas and displays which is generated before or when the smartphone is engaged with the coupling element. In this case, the vehicle-resident actuators, antennas and displays may change operation upon command from or by the smartphone.

Information about environmental, road or traffic conditions around the vehicle may be obtained using at least one vehicle-resident sensor and transmitted to a remote site or to another vehicle via the smartphone when the smartphone is engaged with the coupling element.

The coupling element may be connected with a vehicle bus to which one or more vehicle-resident sensors, displays, actuators and antennas are connected. In this case, data from the one or more vehicle-resident sensors, displays, actuators and antennas is transferred to the smartphone via the vehicle bus.

The smartphone-engaging coupling element in the vehicle may comprise a Bluetooth communication system in the vehicle.

Various vehicular systems that change their operation in accordance with the commands received by the vehicle from the smartphone when the smartphone is engaged with the coupling element may involve causing notification of a potential collision involving the vehicle to be provided via the at least one vehicular system, causing position of a seat to be controlled by a seat positioning system, causing temperature of a passenger compartment to be controlled by a passenger compartment temperature system and causing position of a mirror to be controlled by a mirror positioning system.

In another embodiment, a method for controlling a vehicle in accordance with the invention includes arranging a smartphone-engaging coupling element in the vehicle, generating data about operational status of the vehicle from one or more vehicle-resident systems after engagement of a smartphone with the coupling element is detected, transferring the generated data about operational status of the vehicle to the smartphone when the smartphone is engaged with the coupling element, receiving commands at the vehicle from the smartphone when the smartphone is engaged with the coupling element, the commands being based in part on the generated data transferred to the smartphone when the smartphone is engaged with the coupling element, and then causing at least one vehicular system to change its operation in accordance with the commands received at the vehicle from the smartphone when the smartphone is engaged with the coupling element. The same additional features described for the method above may be applied in this method as well.

BRIEF DESCRIPTION OF THE DRAWINGS

The following drawings are illustrative of embodiments of the system developed or adapted using the teachings of at least one of the inventions disclosed herein and are not meant to limit the scope of the invention as encompassed by the claims.

DETAILED DESCRIPTION OF THE INVENTION

Figure 1:
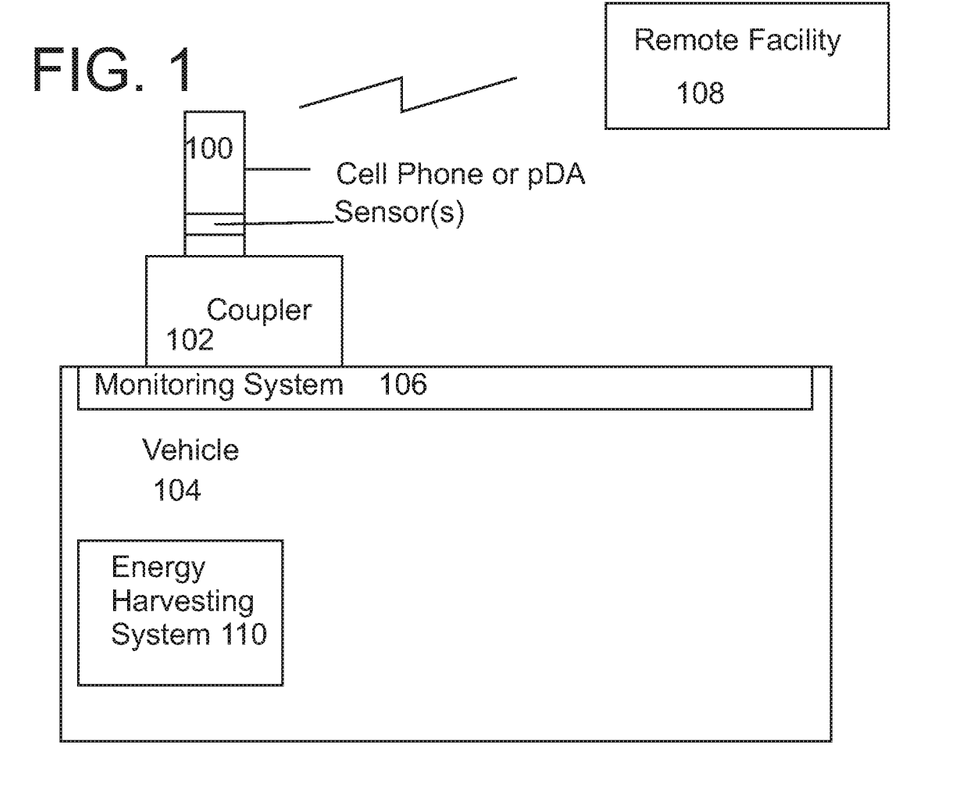
FIG. 1 is a schematic showing the use of a cell phone or PDA for monitoring a vehicle in accordance with the invention.

Referring to the accompanying drawings wherein like reference numbers refer to the same or similar elements, FIG. 1 shows an embodiment wherein a cell phone, personal data assistant or smartphone is used to interact with a vehicle 104. Cell phones and smartphone currently being sold contain a GPS-based location system as do many PDAs. The cell phone, smartphone, PDA or similar portable telecommunications device (collectively referred to as a portable device) 100 is mounted through a snap-in attachment system 102, for example, wherein the portable device 100 is firmly attached to the vehicle 104.

A vehicle monitoring device 106 can at that point, for example, obtain an ID number from a container being monitored through a variety of methods such as a RFID, SAW or hardwired based system. It can also connect to a satellite antenna that would permit the device to communicate to a LEO or GEO satellite system, such as Skybitz. Since the portable device 100 would only operate on a low duty cycle, its battery should last for many days or perhaps longer. Of course, if it is connected to the vehicle power system, or to an energy harvesting system 110, its life could be indefinite. When power is waning, this fact can be sent to the satellite or cell phone system to alert the appropriate personnel at a remote monitoring facility or emergency response facility 108.

Since the portable device 100 contains a microphone, it could be trained, using an appropriate pattern recognition system, to recognize the sound of an accident or the deployment of an airbag or similar event. It thus becomes a very low cost OnStar® type telematics system. The portable device 100 could be programmed to transmit a signal when it detects any of these noises, i.e., to the remote monitoring facility or emergency response facility 108. The remote facility 108 could then direct aid to the vehicle 104 once the position of the vehicle 104 is determined.

The portable device 100 could also be used to provide information to enable an off-site computer, e.g., at a remote location, to determine the position of the portable device 100 and thus the vehicle 104 or other asset in which it is arranged. The cell phone would provide data about reception of signals, e.g., from satellites and/or other wireless beacons, and this data would be transmitted via the communications function of the portable device 100 to the remote facility 108. At the remote facility 108, the position or location of the portable device 100 (and vehicle 104) would be determined by performing, e.g., DGPS calculations.

As an alternative to using a satellite network, the cell phone network can be used in essentially the same manner when a cell phone signal is available. Sensors for monitoring the vehicle 104 (not shown) can either be incorporated into the portable device 100 or placed on the vehicle 104 and connected to the portable device 100 when the portable device 100 is attached to the vehicle 104. This system has a key advantage of avoiding obsolescence. With technology rapidly changing, the portable device 100 can be exchanged for a later model or upgraded as needed or desired, keeping the overall system at the highest technical state. Existing telematics systems such as OnStar® can of course also be used with this system.

Importantly, an automatic emergency notification system can now be made available to all owners of appropriately configured cell phones, PDAs, or other similar portable devices 100 that can operate on a very low cost basis without the need for a monthly subscription since they can be configured to operate only on an exception basis. Owners would pay only as they use the service. Stolen vehicle location, automatic notification in the event of a crash even with the transmission of a picture for camera-equipped devices is now possible. Automatic door unlocking can also be done by the portable device 100 since it could transmit a signal to the vehicle 104, in a similar fashion as a keyless entry system, from either inside or outside the vehicle 104. The portable device 100 can be equipped with a biometric identification system (not shown) such as fingerprint, voice print, facial or iris recognition etc. thereby giving that capability to vehicles. The portable device 100 can thus become the general key to the vehicle 104 or other asset such as a house, and can even open the garage door etc. If the portable device 100 is lost, its whereabouts can be instantly found since it has a GPS receiver and knows where it is. If it is stolen, it will become inoperable without the biometric identification from the owner.

Smartphones

Another embodiment of the invention combines advantages of the vehicle with those of a smartphone to improve driving safety, security and experience of the vehicle operator.

In these embodiments, when a smartphone is brought into a vehicle, it will be connected to a vehicle bus via a coupling element (similar to snap-in attachment system 102 in FIG. 1), and the vehicle bus contains data from a variety of vehicle resident sensors and other peripherals including various actuators, antennas and displays. Preferably, the power and data connections will be accomplished wirelessly. For example, power can be transferred to the smartphone inductively and data by the Bluetooth or equivalent protocol. The term "peripheral" will be used herein to generally include all such vehicle resident sensors, actuators, antennas and displays. Sensors generally will refer to vehicle resident sensors; however, they can also include sensors brought into the vehicle such as occupant resident health monitoring sensors as well as smartphone resident sensors.

In general, any peripheral configuration can be accommodated and optimized by a smartphone since the drivers and other relevant information can be downloaded from the Internet in the same way that occurs when a new device is connected to a home computer. If the appropriate optimizing software is not resident on the smartphone, the optimization function can be done in the cloud. With satellite communication, internet access is ubiquitous so this process can occur anywhere on the continental United States.

Figure 2:
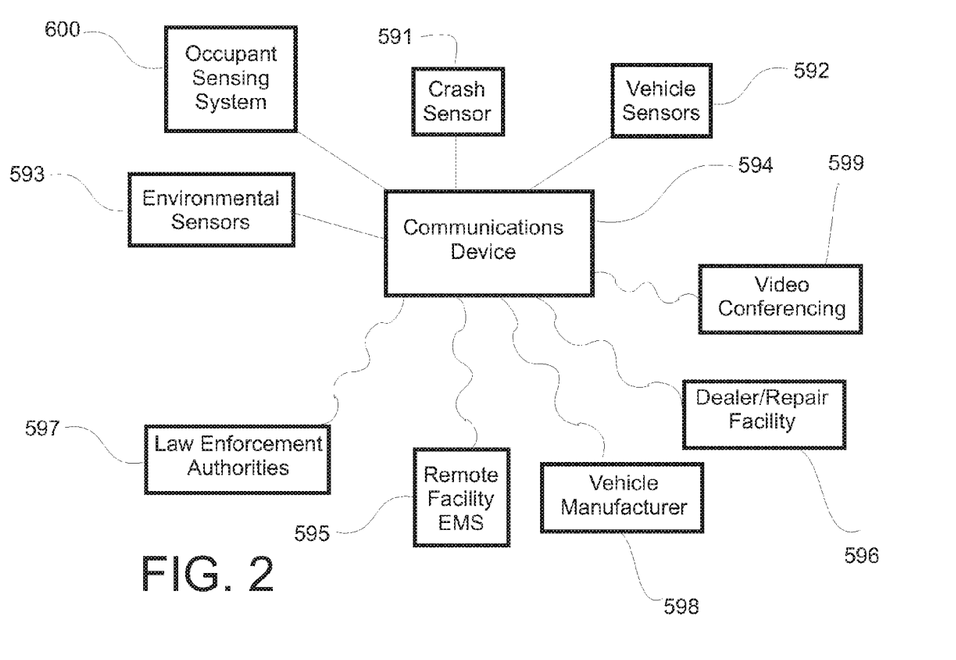
FIG. 2 is a schematic view of overall telematics system in accordance with the invention.

FIG. 2 shows a schematic of integration of vehicular occupant sensing with a telematics link and vehicle diagnostics with a telematics link. Occupant sensing system 600 includes those components which determine the presence, position, health state, and other information relating to the occupants, for example the transducers discussed with reference to FIGS. 1, 2 and 61 of the parent '363 application and the SAW device discussed with reference to FIG. 62 of the '363 application. Information relating to the occupants includes information as to what the driver is doing, talking on the phone, communicating with OnStar® or other route guidance, listening to the radio, sleeping, drunk, drugged, having a heart attack. The occupant sensing system 600 may also be any of those systems and apparatus described in the current assignee's patents and patent applications or any other comparable occupant sensing system which performs any or all of the same functions as they relate to occupant sensing. Examples of sensors which might be installed on a vehicle and constitute the occupant sensing system include heartbeat sensors, motion sensors, weight sensors, microphones and optical sensors.

A crash sensor system 591 is provided and determines when the vehicle experiences a crash. This crash sensor may be part of the occupant restraint system or independent from it. Crash sensor system 591 may include any type of crash sensors, including one or more crash sensors of the same or different types.

Vehicle sensors 592 include sensors which detect the operating conditions of the vehicle such as those sensors discussed with reference to FIGS. 136-141 of the parent '881 application. Also included are tire sensors such as disclosed in U.S. Pat. No. 6,662,642. Other examples include velocity and acceleration sensors, and angle and angular rate pitch, roll and yaw sensors. Of particular importance are sensors that tell what the car is doing: speed, skidding, sliding, location, communicating with other cars or the infrastructure, etc.

Environment sensors 593 includes sensors which provide data to the operating environment of the vehicle, e.g., the inside and outside temperatures, the time of day, the location of the sun and lights, the locations of other vehicles, rain, snow, sleet, visibility (fog), general road condition information, pot holes, ice, snow cover, road visibility, assessment of traffic, video pictures of an accident, etc. Possible sensors include optical sensors which obtain images of the environment surrounding the vehicle, blind spot detectors which provide data on the blind spot of the driver, automatic cruise control sensors that can provide images of vehicles in front of the host vehicle, various radar devices which provide the position of other vehicles and objects relative to the subject vehicle.

The occupant sensing system 600, crash sensors 591, vehicle sensors 592, environment sensors 593 and all other sensors listed herein can be coupled to a communications device 594 which may contain a memory unit and appropriate electrical hardware to communicate with the sensors, process data from the sensors, and transmit data from the sensors. The memory unit would be useful to store data from the sensors, updated periodically, so that such information could be transmitted at set time intervals.

The communications device 594 can be configured to transmit information to any number of different types of facilities. For example, the communications device 594 may be configured to transmit information to an emergency response facility 595 in the event of an accident involving the vehicle. The transmission of the information could be triggered by a signal from a crash sensor 591 that the vehicle was experiencing a crash or experienced a crash. Information being transmitted could originate from the occupant sensing system 600 so that the emergency response could be tailored to the status of the occupants. For example, if the vehicle was determined to have ten occupants, multiple ambulances might be sent. Also, if the occupants are determined not be breathing, then a higher priority call with living survivors might receive assistance first. As such, the information from the occupant sensing system 600 is used to prioritize the duties of the emergency response personnel.

Information from the vehicle sensors 592 and environment sensors 593 can also be transmitted to law enforcement authorities 597 in the event of an accident so that the cause(s) of the accident could be determined. Such information can also include information from the occupant sensing system 600, which might reveal that the driver was talking on the phone, putting on make-up, or another distracting activity, information from the vehicle sensors 592 which might reveal a problem with the vehicle, and information from the environment sensors 593 which might reveal the existence of slippery roads, dense fog and the like.

Information from the occupant sensing system 600, vehicle sensors 592 and environment sensors 593 can also be transmitted to the vehicle manufacturer 598 in the event of an accident so that a determination can be made as to whether failure of a component of the vehicle caused or contributed to the cause of the accident. For example, the vehicle sensors might determine that the tire pressure was too low so that advice can be disseminated to avoid maintaining the tire pressure too low in order to avoid an accident. Information from the vehicle sensors 592 relating to component failure could be transmitted to a dealer/repair facility 596 which could schedule maintenance to correct the problem.

The communications device 594 can be configured to transmit particular information to each site, i.e., only information important to be considered by the personnel at that site. For example, the emergency response personnel have no need for the fact that the tire pressure was too low but such information is important to the law enforcement authorities 597 (for the possible purpose of issuing a recall of the tire and/or vehicle) and the vehicle manufacturer 598.

In one exemplifying use of the system shown in FIG. 2, the operator at the remote facility 595 is notified when the vehicle experiences a crash, as detected by the crash sensor system 591 and transmitted to the remote facility 595 via the communications device 594. In this case, if the vehicle occupants are unable to, or do not, initiate communications with the remote facility 595, the operator would be able to receive information from the occupant sensing system 600, as well as the vehicle sensors 592 and environmental sensors 593. The operator could then direct the appropriate emergency response personnel to the vehicle. The communications device 594 could thus be configured to automatically establish the communications channel with the remote facility when the crash sensor system 591 determines that the vehicle has experienced a crash.

The communications device 594 can be a cellular phone, smartphone, OnStar® or other subscriber-based telematics system, a peer-to-peer vehicle communication system that eventually communicates to the infrastructure and then, perhaps, to the Internet with e-mail to the dealer, manufacturer, vehicle owner, law enforcement authorities or others. It can also be a vehicle to LEO or Geostationary satellite system such as Skybitz which can then forward the information to the appropriate facility either directly or through the Internet. It can also be directly to a ubiquitous internet system such as WiMAX.

The communication may need to be secret so as not to violate the privacy of the occupants and thus encrypted communication may in many cases be required. Other innovations described herein include the transmission of any video data from a vehicle to another vehicle or to a facility remote from the vehicle by any means such as a telematics communication system such as OnStar®, a cellular phone or smartphone system, a communication via GEO, geocentric or other satellite system and any communication that communicates the results of a pattern recognition system analysis. Also, any communication from a vehicle that combines sensor information with location information is encompassed by at least one of the inventions disclosed herein.

When optical sensors are provided as part of the occupant sensing system 600, video conferencing becomes a possibility, whether or not the vehicle experiences a crash. That is, the occupants of the vehicle can engage in a video conference with people at another location 599 via establishment of a communications channel by the communications device 594.

The vehicle diagnostic system described above using a telematics link can transmit information from any type of sensors on the vehicle.

Any or all of the information obtained from occupancy and other onboard sensors can be part of the information sent to the remote location via the communication or telematics system.

Figure 3:
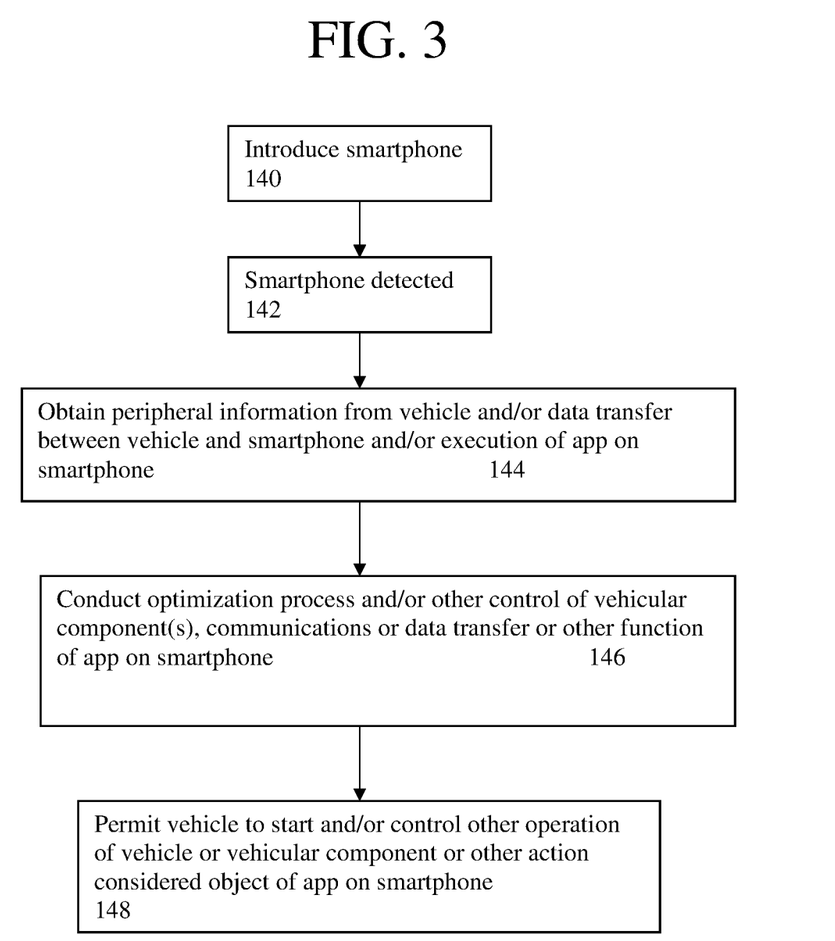
FIG. 3 is a flow chart showing use of a smartphone in an embodiment of a method of the invention.

With reference to FIG. 3, when a new smartphone is introduced to a vehicle 140 and detected after coupling to the coupler element 142, the smartphone will obtain the peripheral information from the vehicle 144, conduct the optimization process 146 and then permit the vehicle to be started 148. More specifically, when the smartphone is introduced into the vehicle, the smartphone and vehicle 144 will couple which requires sending data (some kind of handshake) back and forth. This coupling may be by means of a smartphone-engaging coupling element, which may be a physical, in-contact coupler element 142 or Bluetooth® or similar wireless coupling which still requires tangible hardware components in the vehicle 144 and smartphone to effect the coupling. These hardware components, other used in conjunction with software, will be referred to as coupling means, or a coupling arrangement.

The vehicle 140 will then indicate that it is ready to receive data, such as the desired destination of the journey to be undertaken, which will then be sent by the smartphone to the vehicle 140 via the coupling arrangement. Other data can be requested by the vehicle 140 to establish whether toll roads are to be avoided and the maximum desired speed. Also, an inquiry may be made as to whether the vehicle 104 should take the fastest route or the most scenic. Finally, the vehicle 140 may require billing information from or by means of the smartphone coupled thereof if the vehicle 140 is not owned by the user.

To enable the smartphone to provide guidance directions to the driver to enable the driver to be directed to their determined destination using the route guidance system on the smartphone or vehicle, the data provided by the vehicle to the smartphone immediately upon coupling of thereafter, may include its current position (provided by a typical vehicle-based positioning system) and the status of the vehicular components required for operating the vehicle e.g., ignition or engine status, transmission, steering wheel, etc. (provided by vehicular sensors, systems, actuators, etc.). The vehicular component status and current position data is then used by the smartphone to generate directions to be displayed and/or vocalized to the driver, either on the smartphone's display or the vehicle's display.

In a remote access embodiment where the smartphone is used to hail a vehicle, assuming that the vehicle 140 is not at a location known and near the user, data as to where the vehicle 140 is and how soon it will arrive can also be sent by the vehicle 140 to the user via an app on the user's smartphone.

Basically, if the vehicle is not used by the owner, a processor on the vehicle is configured to inquire from the user of the smartphone about the user's preferences and how the trip will be billed. If it is owned by the user, then it will still need to know the destination and perhaps some other information. It either case, the vehicle 140 will send a message, or more generally data, to the smartphone that it is operational, e.g., the engine is running or the ignition is on, and ready to receive data. This data may be derived from sensors, systems, etc. on the vehicle and known to be capable of providing operational information about the vehicle to the vehicle bus to be conveyed therethrough to the smartphone when coupled to the vehicle bus via the coupling arrangement.

Figure 4:
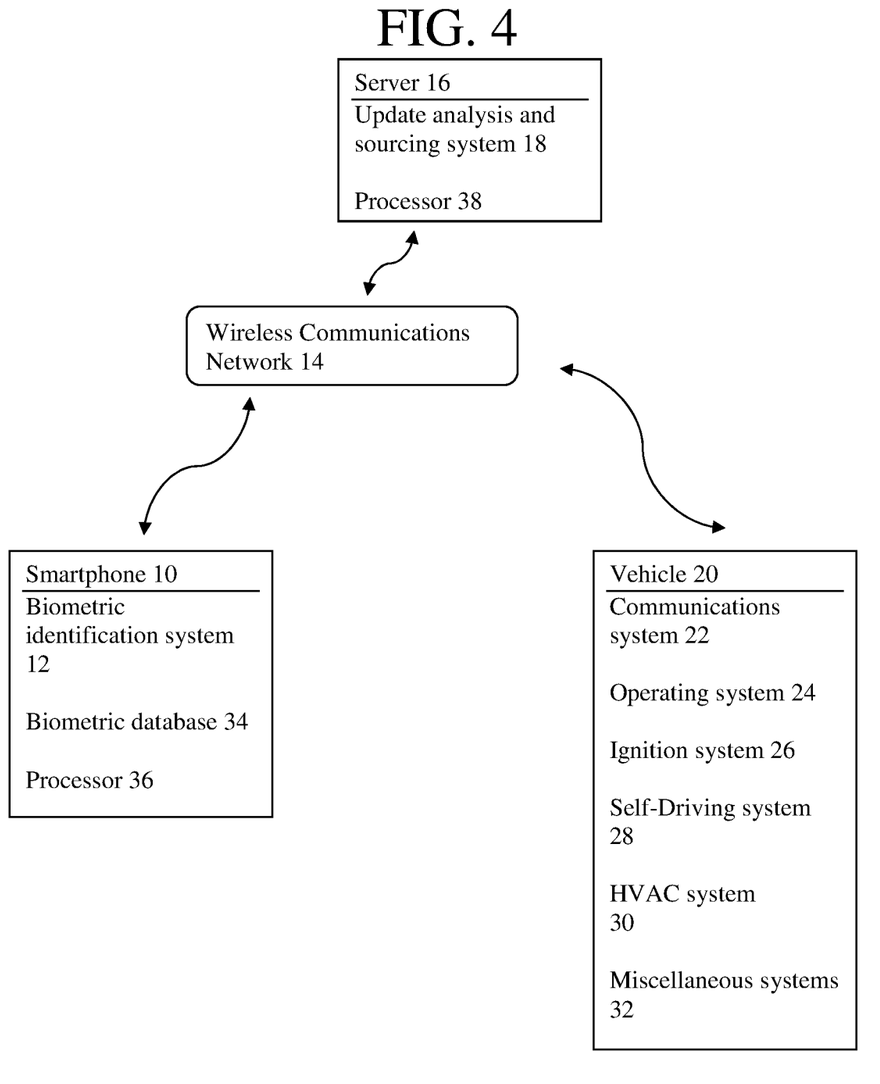
FIG. 4 is a schematic showing principal operating components for use in a method in accordance with the invention.

As shown in FIG. 4, the smartphone 10 includes a biometric identification system 12. Since the smartphone is handled by the owner, it can verify biometrically the owner and eliminate security considerations. As such, ignition of the vehicle may be enabled via ignition system 26 on vehicle 20 when the 10 smartphone is coupled to the vehicle via a wireless communications network 14 or a physical coupling element by detecting the presence of identification and/or authorization information on the smartphone 10 allowing for vehicle ignition.

A car may sit for months without being used and have obsolete software, thus, it cannot in general be the computing platform for the vehicle. On the other hand, if a smartphone is not present, the vehicle system can revert to the "as manufactured" system allowing the use of a conventional key etc. The absence of a smartphone coupled to the vehicle can be detected by a sensor (not shown) associated with the coupler element. If a smartphone is present, i.e., coupled to the coupler element and this coupling detected by a sensor or simply by virtue of initiation of data transfer between the smartphone and the vehicle, then it can assume many of the vehicle computational, communication and control functions. That is, the processor on the smartphone will undertake processing of data obtained by vehicle-resident peripherals.

The smartphone has and will have a computer, communications capability and the software to act as the vehicle computer replacing much of the existing vehicle resident computing system. The smartphone will also have limited sensor capabilities including a microphone and camera. The vehicle has and will have limited computational capabilities plus sensors that sense the vehicle, vehicle occupants and the environment. Some vehicle sensors such as cameras can be upgradable but generally they will not change during the vehicle life. In some cases, the vehicle owner will be able to add and or replace sensors that will not necessarily interface with vehicle resident systems.

The smartphone will interface with the vehicle sensor bus and thus have all of the vehicle sensor data available. Smartphone apps will recognize the hardware suite that is vehicle resident and analyze data from the vehicle sensors plus the smartphone sensors and communicate to the driver and remote sites including other vehicles. This can be used for collision avoidance (sending location and velocity data to nearby vehicles), occupant health monitoring, automatic collision notification, electronic tolling (to replace E-Z Pass, SunPass, etc.) and other functions. People will carry there cellphone much as they now do their wallet. The smartphone can have a biometric sensor to verify that the proper person is using it. When in the vehicle, it does one or more of the functions mentioned above while it is also being charged via a charging device associated with the coupling element. The smartphone can also control the vehicle displays such as the HUD.

A key advance of this invention is to add adaptability and flexibility to the vehicle and driving experience. It opens the vehicle to thousands of programmers who can develop apps for vehicles. When safety issues are involved, a licensing process may be necessary where the government or industry committee can ascertain that a new app does not degrade the vehicle safety system. The smartphone thus becomes the main telematics unit in the vehicle replacing such systems as GM OnStar and Ford Sync.

The new system will affect, among other things, the safety, navigation, security, infotainment, vehicle diagnostics systems and location-based services.

Although smartphones primarily make use of cell phone towers for communication, there are times where the cell phone tower signal is not available or reliable and thus other communication channels are needed. In the case of the Ford Sync system, these channels are provided by the vehicle. Additionally or alternatively, the channels can be provided by the vehicle and/or the smartphone. As various generations (e.g., LTE) of cell phone communication systems are implemented, a larger and larger percentage of the North America will be covered until such coverage is ubiquitous. In those areas where coverage is not available through terrestrial towers, satellite communication can now be used. Satellite communication requires greater power and is aided by larger antennas than are generally available in cell phones and thus such power and antennas can be provided by the vehicle. Other communication systems that can be used when available include WiMAX, WiFi hotspots and DSRC. DSRC is intended to consist of a family of transceivers located on the US federal highway system to improve vehicle-to-vehicle communication to reduce collisions. When DSRC is used, the antennas and transceivers can be located on the vehicle and, as in satellite communication, accessed by the smartphone through its connection with the vehicle.

Sensors that are currently resident on smartphones include one or more cameras, a microphone and various inertial sensors. To make effective use of these sensors, the mounting of the smartphone in the vehicle is important. The smartphone should be mounted such that the camera thereof has a clear view of the driver and the microphone can receive spoken words of the driver. These sensors can be supplemented by similar sensors that are vehicle resident in which case, the mounting of the smartphone is less important. If the smartphone is to be used for measuring vehicle motions such as would be present in a crash, for example, then again its mounting to the vehicle is important. Other sensors that can be present in the smartphone include a biometric sensor for user identification such as one that captures a fingerprint, facial image, iris image or other biometric property used for person recognition and identification.

Other sensors which may be on or used in conjunction with a smartphone include a breathalyzer or other alcohol sensor such as a sensor that measures the alcohol content in the blood near the skin, temperature sensor, humidity sensor, atmospheric chemical or radiation sensor and health monitoring sensors. For example, an alcohol sensor such as available from TruTouch Technologies can be incorporated into a smartphone and used to check for blood alcohol content before permitting a vehicle to be started. If a biometric identification can be accomplished by a modification of the same device through measuring blood vessel patterns, for example, then the system cannot be circumvented through a test on another person. This concept is also applicable for the TruTouch system now being tested by Takata under support from NHTSA for automobile starting systems. Of course many other sensors and sensor systems can be resident on a smartphone or positioned to communicate to the smartphone either wirelessly or by wires that are not attached to the vehicle.

Apps for smartphones are currently under development and entering the marketplace to provide, for example, automatic collision notification for vehicles that are not so equipped. Since apps can be developed by any programmer, the number of such apps for smartphones is large and increasing exponentially. This capability can be leveraged to provide the software needed to drive the vehicle smartphone marriage to improve vehicle safety, security, navigation, diagnostics, infotainment and location-based services as discussed in more detail below. Such apps, for example, can pool the available peripherals on the vehicle, sensors on the smartphone, communication channels etc and configure a system that makes optimum use of the available devices and channels. Thus any smartphone can adapt itself to any vehicle that is equipped to interface to a smartphone. This configuration process need not be time consuming since there are only a relatively small number of such combinations and once configured, it can be stored in the smartphone and in the cloud to minimize configuration time in the future and for others. The apps can also take into account personal preferences such as seat position, vehicle temperature, mirror positions and travel routes. As the apps improve to make better use of peripherals, for example, the software on the smartphone can be automatically updated in much the same way as new program versions automatically update software on personal computers.

Communication from the smartphone need not make use of only a single channel. When two vehicles are on a collision course, for example, all channels may not be available to all relevant vehicles. Thus, the vehicles can simultaneously broadcast their positions and velocities using a system similar to the ADS-B system of airplanes, establish an ad hoc network with vehicles in the vicinity, transmit to a DSRC transceiver or to the Internet thereby maximizing the chance that the information will be received by all relevant vehicles in time to prevent a collision.

Apps on the smartphone are expected to make significant use of voice recognition in much the same way as some high end vehicle do so now. This is particularly important in vehicles where texting or any manual manipulation of the phone can cause an accident. Of course, this will now be available to all vehicles that provide the smartphone interface regardless of their cost. The voice recognition software will also be far superior to that now offered on vehicles due to the larger development community. Such software can be expected to work in many languages and thus also to be able to translate between languages. Voice recognition can be supplemented by gesture recognition, as described in U.S. Pat. Appln. Publ. No. 20080065291, either to augment or supplement voice commands. The driver, for example, can say temperature and then give a thumb up gesture to cause the vehicle to raise the interior temperature.

In general, the smartphone will be connected to the Internet when it is mounted in the vehicle. Thus, the vehicle or smartphone can also connect to a wireless router permitting other occupants of the vehicle to connect to the Internet for any desired purpose including providing TV shows and movies for occupants other than the driver.

The smartphone can also be used in place of a key to permit locking and unlocking of the vehicle doors and trunk and even opening of the doors to ease entry into the vehicle. When the vehicle is given to a parking lot attendant, the phone can permit vehicle operation according to some time or geographical constraints until the owner returns to retrieve the vehicle. A separate physical key can of course also be provided for such purposes. The smartphone can now be also used for opening any locked door including homes, apartments, garages office, buildings etc.

As an example of how such a system can be used consider the case of a driver convicted of a DUI offense that must be able to drive in order to get to work. The alcohol sensor described above can communicate with a remote site. The remote site can verify that the identified driver uses the sensor and passes the blood alcohol test and then permit the vehicle to be driven. In another example, the smartphone or vehicle-resident camera finds the eyes of the driver and controls the position of images on a heads up display (HUD). In still another example, the software that analyzes the vehicle sensors can be more sophisticated than that currently in use and can not only diagnose that there is a vehicle mechanical or electrical problem (diagnostics) but can forecast that a problem will occur (prognostics). This forecast can be based not only on the sensor readings and trends in the readings but also based on the influence of the temperature of the environment around the vehicle and on the history of similar vehicles. This additional information can be obtained from the Internet.

Theft of cargo can also be reduced through the system described above by using the smartphone-based biometric identifying system to ascertain that the proper driver is about to operate the vehicle hauling the cargo. It can also be used to send SMS or equivalent messages on the status of the cargo and trailer as disclosed in U.S. provisional patent application Ser. Nos. 61/452,418 filed Mar. 14, 2011 and 61/508,822 filed Jul. 18, 2011. If the expected driver is not operating the vehicle or the expected SMS messages are not received, the vehicle can be disabled, reported stolen to local authorities or take any of the other measures as described in these provisional patent applications.

In another application, the system will know that the smartphone is in a vehicle and thus the vehicle can be used as a probe vehicle to obtain information with regard to traffic, weather conditions and in particular visibility which can then be used to set local speed limits. Other probe attainable information includes road conditions such as the existence and location of pot holes or ice, incidents such as the existence of a fallen tree or accident not involving the host vehicle and the environment such as the presence of airborne chemical vapors or radiation. Furthermore, the cloud-based system can know the status of all traffic lights and warn the driver if the vehicle is approaching a red light at an excessive speed. It can even automatically slow and stop the vehicle, thereby preventing many intersection collisions.

A key feature of the Onstar® system is the presence of live operators. With a generally available system that is not tied to a vehicle manufacturer, the possibility for competing and specialized live operators is not only reduced in cost but made far more useful and efficient. The smartphone can connect to different specialized operators based on the choice of the smartphone owner. Thus, an accident can connect the driver to his personal health care provider that knows his particular medical conditions and at the same time to emergency services so that responders can be optimally prepared. Insurance companies and/or automobile clubs such as AAA can be notified based on the preset preferences of the smartphone owner. Additionally, the gas station brand or restaurant type choice can be found based on the preferences of the smartphone owner rather than one size fits all as provided by Onstar®.

There are times where a private vehicle needs to assume emergency vehicle status when there is a medical emergency and time is critical for getting to a hospital, for example. In such a case, all similarly equipped vehicles as well as the local authorities can be notified so that that path to the hospital is cleared and even police escort provided. This can be accommodated either through an app or a live operator specializing in such acts as well as the vehicle-to-vehicle communication system described above.

Vehicle

The vehicle has many resident sensors that are currently used, generally individually, to diagnose various conditions relating to the vehicle and its components. As described in, for example, U.S. Pat. No. 7,103,460, many of these sensors can be used in combination to perform prognostics to predict that a component will fail and to do so in time to prevent a failure. In some cases, a few sensors that are not currently in most vehicles can be added to significantly improve this process. A microphone, for example, can detect many sounds indicative of future component failures and yet such a sensor is not typically available for this purpose on most vehicles. A microphone is available on all smartphones and with the proper app can be used for this function. Additionally, microphones that are installed on a vehicle can be incorporated into a diagnostic system using a smartphone available app. Similarly, various inertial sensors (e.g., accelerometers, gyroscopes) that are resident on the vehicle and on the smartphone can contribute to diagnostics and prognostics through an app that can be made available to all smartphone owners.

Through the information available on the Internet, the smartphone can also advise the vehicle owner that there is a new better sensor available that can be substituted for an existing sensor as a vehicle hardware upgrade. Although this will probably not occur with great frequency, it nevertheless informs the vehicle owner about the availability of upgrades or even new hardware that can be readily added to the vehicle thus providing the ability to upgrade the capabilities of his or her vehicle.

Many vehicles now have various vision or radar-based sensors that sense objects such as pedestrians, animals, signs and other vehicles in the space surrounding the vehicle. The software needed to identify and/or categorize such objects can be sophisticated and expensive to develop. Thus, the software on one vehicle may be inferior to that on another and all such software will be grossly inferior to that that can be developed by the army of programmers willing to take on that task. For example, Automotive Technologies International, Inc. was able to attain about 99.99% accuracy in vehicle occupant categorization using a single camera while a larger company using essentially the same hardware was only able to obtain about 95% accuracy. By opening the development of such software to the software development community with the opportunity of selling smartphone apps, such highly accurate software can be made available to the public at large. The vehicle manufacturer would only need to make the data from such sensors available to the data bus for use by smartphone software developers.

An alcohol sensor such as under development by TruTouch described above, or as described in U.S. provisional patent application Ser. No. 61/452,469 and U.S. Pat. Appln. Publ. No. 20070025597 or in U.S. Pat. Nos. 6,793,242 and 7,768,380, can be vehicle-resident and can be analyzed by an app resident on the smartphone. Similarly, occupant sensors of various types including in particular an optical-based sensor intended to airbag suppression would be vehicle resident as would be the main software that analyzes the sensor output and controls the deployment of the airbags. This software is generally not changed once it is incorporated into the vehicle airbag system even though improvements may have been made. Also such software may be limited by the computer capabilities resident on the vehicle. Neither of these problems exists in a smartphone-based system thus permitting improvements to the safety systems of the vehicle. Additionally, newer occupant sensors may become available that can be retrofitted onto the vehicle. A fisheye type camera, for example, may become available that can be retrofitted and mounted onto the ceiling of the passenger compartment of the vehicle which not only accurately monitors both the driver and front seated passenger for airbag deployment control purposes, but can also serves other purposes such as monitoring for intruders into any part of the vehicle and determining the number of vehicle occupants and their injury state after an accident to aid emergency responders.

Various crash, rollover, electronic stability control and other vehicle dynamics measuring sensors should be available on the data bus which connects to the smartphone for a variety of purposes including diagnostics, prognostics and automatic collision notification. The smartphone should be able to replicate the key fob functions so that the phone can be used to unlock and perhaps open one or more doors and the trunk and also to permit remote starting to warm up the vehicle in the winter, for example. Once the smartphone is properly attached to the vehicle, it can also be used to start the engine or the engine can start automatically with the mounting of the smartphone.

Health monitoring is becoming an increasingly important research topic in the vehicle safety community where the health of the driver is monitored and an alert or appropriate action is taken when safety considerations warrant. This is discussed in U.S. provisional patent application Ser. No. 61/452,469, now expired. In this invention, the health analysis is performed on the smartphone or, alternately, in a cloud based server. In this manner, improvements to the software can be automatically incorporated.

The ability to display the road edges and objects on or near the roadway onto a HUD is greatly augmented if the location of the eyes of the driver is known, as described in U.S. Pat. No. 7,860,626. The smartphone-resident camera and/or a camera mounted on the vehicle can be used for this purpose and the software to control the HUD projection or display system can reside in the smartphone for the reasons described above.

In addition to the safety restraint system, a number of the comfort and convenience systems that reside on the vehicle can be controlled from apps resident on the smartphone. These include the seat controls, HVAC controls and adjustable ride controls among others.

Although a GPS receiver will in general be resident on the smartphone, another GPS receiver can also be resident on the vehicle. The existence of two such receivers that are separated from each other allows the orientation of the vehicle to be determined and can assist in rollover detection if the two receivers are laterally displaced from each other.

Antennas for particular communication channels can also reside on the vehicle. This would in general be true for satellite communication due to the greater power requirements and to DSRC channels that may be dedicated for vehicles. The smartphone can still control the message that is sent using either of these systems.

Smartphone to Vehicle Interface

The smartphone requires power and access to sensor data and to the peripherals that are mounted on the vehicle. Although this can be accomplished through one or more wires, wireless connections are preferred for reliability considerations. The power can be supplied to the smartphone, for example, inductively through a coil provided on the vehicle and a mating coil in the smartphone. Capacitive power transfer is also possible but not as common. The connections to the data bus and to the peripherals can also be done wirelessly through a Wi-Fi, Bluetooth or similar system. Physically, the smartphone should be mounted so as to provide a clear view of the driver and allow for the microphone to clearly hear the words spoken by the driver. Of course, there may be some vehicles that have an appropriately placed camera and microphone such that the smartphone devices are not needed.

Enhancements

Many improvements and enhancements will now be evident to those skilled in the art. Two will be mentioned here.

Smartphones are now beginning to be used for making payments. Instead of giving a merchant cash or a credit card for a purchase, the funds can be immediately transferred from the smartphone owner's bank account to that of the merchant through a few keystrokes. The same concept can be used for the payment of tolls on a toll road. Without the need to obtain an E-Z Pass, Sunpass or equivalent, the information can be sent via any one of the communication channels on the vehicle. In fact, the trigger to send such a payment can be the passing of a GPS coordinate location thereby eliminating the need for toll stations at all, including the now being deployed high speed DSRC stations, thereby greatly reducing the cost of collecting tolls. Until that occurs, a generic DSRC antenna system can reside on the vehicle which is tuned to the particular system in use at the toll station. In E-Z Pass territory, it looks like an E-Z Pass and transfers the funds from the owner's account or a buffer account to the tolling authority.

Additional devices will become desirable for placement on a vehicle in order to aid in the interaction between the smartphone and the vehicle since the smartphone keypad or touch screen will not be available for use. Generally, the driver to smartphone interface will be by voice and gesture but for those cases where this is not practical, for example the driver has laryngitis, a touch pad can be made available on the steering wheel in conjunction with a HUD on the windshield. The driver can see the location of his fingers on the display and thus does not need to take his eyes off of the road.

Discussion of Some Fields of Use

Some of the fields of use of this technology will now be discussed.

Safety.

The medical needs of each smartphone owner can either reside on his or her smartphone or in the cloud such that the operation of the vehicle can take into account any disabilities that the driver possesses. Similarly, medical information can be made available to emergency responders before they leave for an accident so that the appropriate equipment is available at the accident scene. Similarly, if multiple occupants are in the vehicle during an accident all of their appropriate medical information can be made available as well as the number of occupants and perhaps the injury state of each.

Navigation.

The navigation system can reside on the smartphone which, since it is generally connected to the Internet, will have updated maps. The display of points of interest and information related thereto in any degree of specificity can be provided and displayed on a vehicle display to improve the experience of tourists, for example. Traffic conditions will be known since all equipped vehicles can act as probe vehicles indicating the state of the traffic along the projected route. The navigation software can thus suggest alternate routes for the driver who is in a rush to reach his or her destination.

Security.

Having a biometric identification system on the smartphone will prevent its unauthorized use by another. It will also make vehicle theft difficult. Monitoring vehicle status can determine whether there has been unauthorized entry and warn the owner before he or she approached the vehicle. If vision-based sensors are resident on the vehicle, the smartphone owner can look inside his or her vehicle from a distance to detect any unauthorized occupant. Even the location of the vehicle in a mall parking lot can be easily determined by the appropriate app that remembers the GPS coordinates of the vehicle when the cell phone was removed.

Infotainment.

The smartphone will be used for many purposes other than its interfacing to a vehicle. Thus, in most cases, the entertainment preferences of the driver will reside on the smartphone. This can include podcasts, audio books, music, radio stations and for other vehicle occupants video content including TV shows, movies etc. No special arrangement needs to be done to bring this infotainment content to the vehicle, thus simplifying this process.

Location-Based Services.

Most people have a preferred brand of gas, or the least expensive brand, for their vehicle and a preferred restaurant type. This information will also generally be resident on the smartphone and when the gas gage in approaching empty the appropriate app can direct the driver to the appropriate gas station. This may in fact be the station with the cheapest gas in the area which the app will also know from Internet posted prices. Similarly, the driver can be directed to the closest Wendy's, if that is his or her choice, at mealtime.

Autonomous Vehicle Interface

Referring back to FIG. 4, teachings of this invention facilitate the expected implementation of self-driving vehicles. In a basic embodiment, biometric data is received from a person at a smartphone while the smartphone is exterior of the vehicle, the smartphone being usable for voice and data communications independent of the vehicle when outside of the compartment defined by the vehicle. Before the person from which the biometric data is received enters the vehicle, a determination is made whether the received biometric data corresponds to biometric data of an authorized user of the vehicle and only if so, entry into and use of a vehicle by the person from which biometric data was received at the smartphone is authorized. If there is no correspondence, entry and use of the vehicle is not authorized. After entry of the person with the smartphone into the vehicle, the smartphone is coupled to the vehicle and data is transferred from the smartphone to a self-driving system on the vehicle to enable a self-driving system to derive a path of travel of the vehicle to a destination from the transferred data. The data transfer may be effected by any known data transfer protocol, and the format is a known format to allow for interpretation of the data by the self-driving system into a series of actuation commands to command vehicular actuators to cause the vehicle to move and be guided to the destination in accordance with traffic procedures. For example, a vehicular operational function, e.g., accelerating, braking, steering, is controlled using the smartphone based in part on the data transferred from the smartphone to the vehicle while the smartphone is coupled to the vehicle. This use may be the provision of route guidance information.

In the case where a vehicle 20 is owned by the owner of a smartphone 10, when the owner desires to use the vehicle 20, a smartphone call can wake up the vehicle operating system 24 and cause the vehicle 20 to drive to or near to the location of the owner. The owner, or another person authorized by the owner, remotely activates the operating system 24 after entry into and use of the vehicle 20 is authorized based on the biometric data received at the smartphone 10 and before the person from which the biometric data is received enters the vehicle 20, by receiving a user-derived command or communication including the same (a call, message, etc.) at the smartphone 10 to cause the vehicle ignition system 26 to start the vehicle 20 and a self-driving system 28 to drive the vehicle 20 to a location provided by the user.

More specifically, in practice what occurs is that the smartphone 10 preferably includes a biometric identification system 12 to ensure that the owner is controlling the vehicle 10, a communications channel is established between the smartphone 10 and a communications system 22 on the vehicle, and the operating system, 24 is coupled to the communications system 22 to receive the command-including communications from the smartphone 10. When the appropriate command is received, the vehicle 10 is started by the ignition system 26 and a self-driving system 28 on the vehicle 20 is controlled by the operating system 22 to provide for driving of the vehicle upon command by the owner using the smartphone 10 to the location specified in the communication or otherwise determined to be the location of the smartphone 10. The owner can also effect control over the HVAC system 30 of the vehicle and other miscellaneous systems 32 to control the environment of the vehicle 10 as desired, e.g., provide for heat, a seating configuration and an entertainment configuration.

Furthermore, as the owner while possessing the smartphone 10 approaches the vehicle 20 or vice versa, the vehicle doors can unlock through a signal sent by the smartphone 10 through a Bluetooth or Wi-Fi, for example, or other wireless connection, using a door control system 34. In this case, the owner of the smartphone 10 is able to remotely activate the door control system 34, after the vehicle 20 has been driven to the location provided by the user or otherwise determined to be a pick-up location, by receiving a user-based command at the smartphone 10 to cause the door control system 34 to unlock and possibly open one or more doors of the vehicle 20. The command may be in the form of or part of a call, text, etc.

The owner, who can have been biometrically identified by a smartphone resident fingerprint, iris or other biometric identification system 12, can enter the vehicle 20 and the smartphone 10 can provide route guidance directions to the vehicle operating system 22. The smartphone 10 can then be physically connected to the vehicle 20 via the coupler mentioned above. These directions can have been previously determined by the owner using his/her smartphone 10 or other computing device and can have been stored in the cloud for easy access by the vehicle operating system 22.

Smartphone 20 can also communication through the wireless communications network 14 with one or more servers 16, one of which includes an update analysis and sourcing system 18 to provide for updating of the software on the smartphone 10 to, for example, improve its interaction with the vehicle 10. The update analysis and sourcing system 18 may be located in the "cloud".

Regardless of where the self-driving vehicle 20 is located, the position of the owner can be obtained via the GPS location system resident on the smartphone 10. The owner of the smartphone 10 can either provided their desired pick-up location to have the vehicle 20 driven to that location, which may or may not be their current location, or when their desired pick-up location is their current location, the location of the smartphone 10 may be determined by obtaining information from a position determining system on the smartphone 10 which is transferred to the self-driving system via the communications link between the smartphone 20 and the communications system 22 on the vehicle 20.

When the smartphone 10 to the vehicle 20, possibly present in the vehicle and coupled thereto in the manner described with respect to FIG. 1, information from the smartphone 10 may be transferred to the self-driving system 28 while the smartphone 10 to enable the self-driving system 28 to interpret the information into a path of travel of the vehicle to a destination. This may entail transferring route guidance information to the operating system 24 on the vehicle that issues commands to the self-driving system 28.

After the owner leaves the vehicle 20 at his/her destination, the vehicle 20 can locate an available parking place either visually or based on information of availability from the internet, for example. Such features of self-driving vehicles are known and may be incorporated into the invention. For example, the self-driving system 28 can be commanded to park the vehicle after the owner leaves the vehicle at the destination. This is an example of controlling a vehicular operational function using the smartphone based in part on data transferred from the smartphone to the vehicle while the smartphone is coupled to the vehicle, the data transferred being data indicating arrival at the destination and the need to park the vehicle 20.

It is anticipated that when autonomous (self-driving) vehicles become ubiquitous, that private ownership of vehicles will decline. When this occurs, a similar arrangement can be implemented where, in this case, the customer indicates the class of vehicle 20 he/she desires using their smartphone 10 and places an order for such a vehicle 20 in a manner similar to the Uber system in wide use today.

This aspect may be implemented in a method that receives vehicle selection data at the smartphone 10 while the smartphone 10 is exterior of the vehicle 20 indicating a type of vehicle for which entry into and use of is sought, and receiving location pick-up data at the smartphone 10 while the smartphone 10 is exterior of the vehicle 20 indicating a location at which the vehicle 20 should be driven to pick up the person from which biometric data was received at the smartphone 10. The location of a vehicle of the indicated type closest to the indicated pick-up location is determined, using a processor at a remote site dedicated to matching vehicle type requests to available vehicles, and an operating system on that vehicle is remotely activated, after entry into and use of that vehicle is authorized based on the biometric data received at the smartphone 10, by receiving a user-based command at the smartphone 10 to cause the vehicle ignition system 26 to start that vehicle and the self-driving system 28 to drive that vehicle to the determined pick-up location.

A processor on the vehicle 20 will determine or be provided with the customer's GPS coordinates and thus his/her location and the smartphone 10 will identify the customer for billing purposes. This aspect may be implemented in a method that obtains, from a database, billing data about the person from which biometric data was received at the smartphone 10, and directs payment from the person from which biometric data was received at the smartphone 10 to an owner or operator of the vehicle 20 after the person from which biometric data was received at the smartphone 10 completes use of the vehicle 20. Any such billing practices that are currently used in vehicular fleet-sharing operations may be used in the invention.

Biometric identification system 12 on the smartphone 10 can employ a variety of biometric methods to identify the smartphone owner, such as by fingerprint, voice print, facial or iris recognition etc., thereby providing the required security level and fraud prevention. A lost or stolen smartphone 10 thus is of no value to another person. The degree of security is determined by the level of the biometrics used to identify the user. For simple, low risk transactions, fingerprints may be sufficient whereas for higher risk transactions, an iris match through using the smartphone's camera may be required. Multi-factor biometric ID is preferred over single factor.

This aspect may be implemented in a method wherein the determination of whether the received biometric data corresponds to biometric data of an authorized user of the vehicle 20 entails storing biometric data about at least one authorized user of the vehicle 20 on the smartphone 10, e.g., in a database or memory component 34 thereof, and analyzing the received biometric data relative to the stored biometric data to determine a degree of correspondence using a processor 36 on the smartphone 10 (see FIG. 4). Only when the degree of correspondence is above a threshold as determined the processor 36, the received biometric data is considered to correspond to biometric data of an authorized user of the vehicle 20, and thus entry into and use of the vehicle is authorized.

The smartphone 10 can thus become the general key to the vehicle 20 or house, and can even open doors of an asset. If the smartphone 10 is lost, its whereabouts can be instantly found since it has a GPS receiver and knows where it is. If it is stolen, it will become inoperable without the biometric identification from the owner.

The Achilles heel of smartphones is the battery. Although progress is being made in extending battery life, automatic charging is an unmet need. Wireless charging is generally inefficient due to the need to concentrate the charging energy to the vicinity of the device. The problem becomes manageable when surfaces are used rather than volumes. Any surface can be provided with a labyrinth of wires which can connect to a smartphone when it is laid onto the surface in a random orientation. Thus when a customer enters a self-driving vehicle he/she can lay his/her smartphone onto a vehicle seat or other appropriate surface where it will be charged.

Eventually, a particular smartphone may not be necessary and all of the personal information can reside in the cloud and made available through any smartphone or other processor through biometric sensors resident on the device. Thus, if a particular smartphone becomes discharged, any other such phone will work. Such phones can be distributed such that one is always available within a short distance of the user. The use of such phones can be billed to the person based on his/her biometric ID. In this case the user may not even own a smartphone but just rent one when it is needed and replace it when it becomes discharged.

This aspect may be implemented in a method wherein the determination of whether the received biometric data corresponds to biometric data of an authorized user of the vehicle 20 entails storing biometric data about at least one authorized user of the vehicle at at least one site remote from the smartphone 10, e.g., at the server 16, and transmitting the received biometric data to the at least one remote site using, at least partly, wireless communication equipment. The received biometric data is analyzed relative to the stored biometric data by a processor 38 at the remote site to determine a degree of correspondence, which analysis may be any known and available biometric data verification technique or method. Only when the degree of correspondence is above a threshold as determined the processor 38, the received biometric data is considered to correspond to biometric data of an authorized user of the vehicle 20, and thus entry into and use of the vehicle is authorized.

Available biometric measurements can include any property which is unique to the user including, for example, face shape, fingerprint, palm print, vein pattern of any body location, odor, skin bacteria, heartbeat shape, voice print, retinal or iris print, and eventually DNA based on a skin or hair cell. Preferably a combination of such factors would be used making spoofing virtually impossible.

Although several preferred embodiments are illustrated and described above, there are possible combinations using other geometries, sensors, materials and different dimensions for the components that perform the same functions. At least one of the inventions disclosed herein is not limited to the above embodiments and should be determined by the following claims. There are also numerous additional applications in addition to those described above. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the following claims.

The invention claimed is:

1. A method for controlling a vehicle, comprising:
arranging a smartphone-engaging coupling element in the vehicle;
causing data about operational status of the vehicle to be transferred from one or more vehicle-resident systems to a smartphone when the smartphone is engaged with the coupling element, the smartphone being usable for voice and data communications independent of the vehicle when outside of a compartment defined by the vehicle;
causing commands to be received by the vehicle from the smartphone when the smartphone is engaged with the coupling element, the commands being based in part on data previously transferred from the one or more vehicle-resident systems to the smartphone when the smartphone is engaged with the coupling element; and then
causing at least one vehicular system to change its operation in accordance with the commands received by the vehicle from the smartphone when the smartphone is engaged with the coupling element.

2. The method of claim 1, wherein the step of causing data about operational status of the vehicle to be transferred from the one or more vehicle-resident systems to the smartphone when the smartphone is engaged with the coupling element comprises causing data from one or more vehicle-resident sensors to be generated when the smartphone is engaged with the coupling element and causing the generated data to be transferred to the smartphone when the smartphone is engaged with the coupling element.

3. The method of claim 2, wherein the step of causing at least one vehicular system to change its operation in accordance with the commands received by the vehicle from the smartphone when the smartphone is engaged with the coupling element comprises causing the one or more vehicle-resident sensors to change its operation.

4. The method of claim 1, wherein the step of causing data about operational status of the vehicle to be transferred from the one or more vehicle-resident systems to the smartphone when the smartphone is engaged with the coupling element comprises causing data from one or more vehicle-resident actuators, antennas and displays to be generated when the smartphone is engaged with the coupling element and causing the generated data to be transferred to the smartphone when the smartphone is engaged with the coupling element.

5. The method of claim 4, wherein the step of causing at least one vehicular system to change its operation in accordance with the commands received by the vehicle from the smartphone when the smartphone is engaged with the coupling element comprises causing the one or more vehicle-resident actuators, antennas and displays to change its operation.

6. The method of claim 1, further comprising:
causing information about environmental, road or traffic conditions around the vehicle to be obtained using at least one vehicle-resident sensor; and
transmitting the information about environmental, road or traffic conditions around the vehicle obtained using the at least one vehicle-resident sensor to a remote site separate and apart from the vehicle or to another vehicle via the smartphone when the smartphone is engaged with the coupling element.

7. The method of claim 1, wherein the coupling element is connected with a vehicle bus to which one or more vehicle-resident sensors, displays, actuators and antennas are connected, the step of causing data about operational status of the vehicle to be transferred from one or more vehicle-resident systems to the smartphone when the smartphone is engaged with the coupling element comprising transferring the data from the one or more vehicle-resident sensors, displays, actuators and antennas to the smartphone via the vehicle bus.

8. The method of claim 1, wherein the step of arranging a smartphone-engaging coupling element in the vehicle comprises arranging a Bluetooth communication system in the vehicle.

9. The method of claim 1, wherein the step of causing at least one vehicular system to change its operation in accordance with the commands received by the vehicle from the smartphone when the smartphone is engaged with the coupling element comprises causing notification of a potential collision involving the vehicle to be provided via the at least one vehicular system.

10. The method of claim 1, wherein the at least one vehicular system is a seat positioning system that controls position of a seat of the vehicle, the step of causing at least one vehicular system to change its operation in accordance with the commands received by the vehicle from the smartphone when the smartphone is engaged with the coupling element comprises causing position of the seat to be controlled by the seat positioning system.

11. The method of claim 1, wherein the at least one vehicular system is a passenger compartment temperature system that controls temperature of a passenger compartment of the vehicle, the step of causing at least one vehicular system to change its operation in accordance with the commands received by the vehicle from the smartphone when the smartphone is engaged with the coupling element comprises causing temperature of the passenger compartment to be controlled by the passenger compartment temperature system.

12. The method of claim 1, wherein the at least one vehicular system is a mirror positioning system that controls position of a mirror of the vehicle, the step of causing at least one vehicular system to change its operation in accordance with the commands received by the vehicle from the smartphone when the smartphone is engaged with the coupling element comprises causing position of the mirror to be controlled by the mirror positioning system.

13. A method for controlling a vehicle, comprising:
arranging a smartphone-engaging coupling element in the vehicle;
generating data about operational status of the vehicle from one or more vehicle-resident systems after engagement of a smartphone with the coupling element is detected, the smartphone being usable for voice and data communications independent of the vehicle when outside of a compartment defined by the vehicle;
transferring the generated data about operational status of the vehicle to the smartphone when the smartphone is engaged with the coupling element;
receiving commands at the vehicle from the smartphone when the smartphone is engaged with the coupling element, the commands being based in part on the generated data transferred to the smartphone when the smartphone is engaged with the coupling element; and then
causing at least one vehicular system to change its operation in accordance with the commands received at the vehicle from the smartphone when the smartphone is engaged with the coupling element.

14. The method of claim 13, wherein the step of transferring the generated data about operational status of the vehicle to the smartphone when the smartphone is engaged with the coupling element comprises transferring data from one or more vehicle-resident sensors to the smartphone when the smartphone is engaged with the coupling element.

15. The method of claim 13, wherein the step of transferring the generated data about operational status of the vehicle to the smartphone when the smartphone is engaged with the coupling element comprises transferring data from one or more vehicle-resident actuators, antennas and displays to the smartphone when the smartphone is engaged with the coupling element.

16. The method of claim 13, further comprising:
obtaining information about environmental, road or traffic conditions around the vehicle using at least one vehicle-resident sensor; and
providing the obtained information about environmental, road or traffic conditions around the vehicle to a remote site or to another vehicle via the smartphone when the smartphone is engaged with the coupling element.

17. The method of claim 13, wherein the coupling element is connected with a vehicle bus to which one or more vehicle-resident sensors, displays, actuators and antennas are connected, the step of transferring the generated data about operational status of the vehicle to the smartphone when the smartphone is engaged with the coupling element comprising transferring the data from the one or more vehicle-resident sensors, displays, actuators and antennas to the smartphone via the vehicle bus.

18. The method of claim 13, wherein the step of arranging a smartphone-engaging coupling element in the vehicle comprises arranging a Bluetooth communication system in the vehicle.

19. The method of claim 13, wherein the step of causing at least one vehicular system to change its operation in accordance with the commands received at the vehicle from the smartphone when the smartphone is engaged with the coupling element comprises causing notification of a potential collision involving the vehicle to be provided via the at least one vehicular system.

20. The method of claim 13, wherein the at least one vehicular system is a seat positioning system that controls position of a seat of the vehicle, the step of causing at least one vehicular system to change its operation in accordance with the commands received at the vehicle from the smartphone when the smartphone is engaged with the coupling element comprises causing position of the seat to be controlled by the seat positioning system.

* * * * *